US008151532B2

(12) United States Patent
Zuber et al.

(10) Patent No.: US 8,151,532 B2
(45) Date of Patent: Apr. 10, 2012

(54) CONSTRUCTION ASSEMBLY OF SKIM COATED PREFABRICATED ELEMENTS AND JOINTING MATERIAL, A KIT THEREFOR, AND METHOD OF ASSEMBLING THE SAME

(75) Inventors: Francois Zuber, Vedene (FR); Claude Leclercq, Pernes-les-Fontaines (FR); Pascal Bourne-Chastel, Mormoiron (FR); Elizabeth A. Colbert, Newark, DE (US); Pierre Gagne, Varennes (CA); Roland Boucher, St-Hubert (CA); Sylvie Bilodeau, St-Armand (CA)

(73) Assignee: Lafarge Platres, Avignon (FR)

( * ) Notice: Subject to any disclaimer, the term of this patent is extended or adjusted under 35 U.S.C. 154(b) by 388 days.

(21) Appl. No.: 10/885,078

(22) Filed: Jul. 7, 2004

(65) Prior Publication Data

US 2004/0237436 A1 Dec. 2, 2004

Related U.S. Application Data

(60) Division of application No. 10/308,084, filed on Dec. 3, 2002, now Pat. No. 7,208,225, which is a continuation of application No. 09/633,264, filed on Aug. 4, 2000, now abandoned, which is a continuation-in-part of application No. 09/316,013, filed on May 21, 1999, now Pat. No. 6,105,325, which is a continuation of application No. 08/793,444, filed on May 9, 1997, now abandoned.

(30) Foreign Application Priority Data

Jun. 30, 1995 (FR) .................................... 95 08153

(51) Int. Cl.
  *E04B 1/00* (2006.01)
(52) U.S. Cl. ..................................... 52/417; 52/742.16
(58) Field of Classification Search .............. 52/417, 52/742.14, 742.16, 747.1; 428/328, 332, 428/514, 703, 537.5, 537.7; 427/402, 403; 156/71; 106/197.01, 772–774, 780, 784, 106/730, 732; 524/42, 44, 423, 425, 431, 524/445, 451
See application file for complete search history.

(56) References Cited

U.S. PATENT DOCUMENTS

| | | | |
|---|---|---|---|
| 1,439,289 A | 12/1922 | Buttress | |
| 1,993,472 A | 3/1935 | Borsari-Fischer | |
| 2,109,719 A | 3/1938 | Brusse | |
| 2,205,423 A | 6/1940 | Lefebure | |
| 2,754,795 A | 7/1956 | Enssie | |
| 2,770,216 A | 11/1956 | Schock | |
| 2,833,139 A | 5/1958 | Bosshard | |
| 2,925,631 A | 2/1960 | Larson et al. | |
| 3,003,979 A | 10/1961 | Ptasienski et al. | |
| 3,180,058 A | 4/1965 | Tillisch et al. | |
| 3,256,223 A | 6/1966 | Heijmer | |
| 3,284,980 A | 11/1966 | Dinkel | |
| 3,303,147 A | 2/1967 | Elden | |
| 3,382,119 A | 5/1968 | Henkel | |
| 3,411,926 A | 11/1968 | Gogek et al. | |
| 3,422,587 A | 1/1969 | Murray | |
| 3,576,091 A | 4/1971 | Shull, Jr. | |
| 3,630,742 A | 12/1971 | Crawford et al. | |
| 3,640,125 A * | 2/1972 | Girard et al. | ........................ 73/73 |
| 3,708,935 A | 1/1973 | Kossuth et al. | |
| 3,819,395 A | 6/1974 | Yocum | |
| 3,835,074 A | 9/1974 | Desmarais | |
| 3,907,725 A | 9/1975 | Forte et al. | |
| 3,975,320 A | 8/1976 | Lane et al. | |
| 3,984,596 A | 10/1976 | Failmezger | |
| 4,018,732 A | 4/1977 | Lakshmanan | |
| 4,117,183 A | 9/1978 | Long | |
| 4,178,273 A | 12/1979 | Brown | |
| 4,205,041 A | 5/1980 | Hymes | |
| 4,238,239 A | 12/1980 | Brown | |
| 4,287,103 A | 9/1981 | Green et al. | |
| 4,294,622 A | 10/1981 | Brown | |
| 4,448,639 A | 5/1984 | Long | |
| 4,454,267 A * | 6/1984 | Williams | ........................ 524/43 |
| 4,558,079 A | 12/1985 | Desmarais | |
| 4,579,610 A | 4/1986 | Kole et al. | |
| 4,657,594 A | 4/1987 | Struss | |
| 4,661,164 A | 4/1987 | Severinghaus, Jr. | |
| 4,672,787 A | 6/1987 | Murphy | |
| 4,686,253 A | 8/1987 | Struss et al. | |
| 4,720,303 A | 1/1988 | Soldatos | |
| 4,725,477 A | 2/1988 | Kole et al. | |
| 4,743,475 A | 5/1988 | Negri et al. | |

(Continued)

FOREIGN PATENT DOCUMENTS

AU 19322/92 1/1993

(Continued)

OTHER PUBLICATIONS

Tech Talk, National Gypsum Company, George Kutcher, Revisiting the Levels of Gypsum Board Finish, 3 pages, Mar. 2004.*

(Continued)

*Primary Examiner* — Jerry Redman
(74) *Attorney, Agent, or Firm* — Buchanan Ingersoll & Rooney PC

(57) ABSTRACT

A construction assembly for interior works including prefabricated elements, wherein the prefabricated elements include a coating layer formed of at least one skim coat deposited on the prefabricated elements by a coating device; and at least one jointing material, e.g. a sealing coat, joint coat and/or joint pointing coat, which joints adjacent said prefabricated elements to form a substantially plane outer surface.

99 Claims, 2 Drawing Sheets

U.S. PATENT DOCUMENTS

| | | | |
|---|---|---|---|
| 4,820,754 A | 4/1989 | Negri et al. | |
| 4,845,152 A | 7/1989 | Palmer | |
| 4,859,248 A | 8/1989 | Thaler et al. | |
| 4,908,240 A * | 3/1990 | Auhorn et al. | 427/391 |
| 4,959,272 A | 9/1990 | Long | |
| 4,965,031 A | 10/1990 | Conroy | |
| 4,972,013 A | 11/1990 | Koltisko | |
| 4,988,543 A | 1/1991 | Houle et al. | |
| 5,019,195 A | 5/1991 | Skinner | |
| 5,039,341 A | 8/1991 | Meyer | |
| 5,055,323 A | 10/1991 | Kole et al. | |
| 5,079,042 A | 1/1992 | Frings | |
| 5,088,260 A | 2/1992 | Barton et al. | |
| 5,102,462 A | 4/1992 | Podlas | |
| 5,143,757 A | 9/1992 | Skinner | |
| 5,207,830 A | 5/1993 | Cowan et al. | |
| 5,230,200 A | 7/1993 | Douglas et al. | |
| 5,258,069 A | 11/1993 | Knechtel et al. | |
| 5,277,712 A | 1/1994 | McInnis | |
| 5,334,243 A | 8/1994 | Hyman | |
| 5,336,318 A | 8/1994 | Attard et al. | |
| 5,487,250 A | 1/1996 | Yount et al. | |
| 5,552,187 A | 9/1996 | Green et al. | |
| 5,653,797 A | 8/1997 | Patel | |
| 5,698,622 A * | 12/1997 | Kohler et al. | 524/304 |
| 5,714,032 A | 2/1998 | Ainsley et al. | |
| 5,746,822 A | 5/1998 | Espinoza et al. | |
| 5,779,786 A | 7/1998 | Patel | |
| 5,869,166 A | 2/1999 | Caldwell | |
| 5,908,521 A | 6/1999 | Ainsley et al. | |
| 5,908,821 A | 6/1999 | Labeque et al. | |
| 5,922,447 A | 7/1999 | Baig | |
| 5,945,198 A | 8/1999 | Deodhar et al. | |
| 5,987,835 A | 11/1999 | Santarossa | |
| 6,077,966 A | 6/2000 | Matsumura et al. | |
| 6,105,325 A | 8/2000 | Zuber et al. | 52/416 |
| 6,106,607 A | 8/2000 | Be et al. | |
| 6,165,261 A | 12/2000 | Wantling | |
| 6,171,388 B1 | 1/2001 | Jobbins | |
| 6,177,180 B1 | 1/2001 | Bodine et al. | |
| 6,221,521 B1 | 4/2001 | Lynn et al. | |
| 6,238,476 B1 | 5/2001 | Sprinkle | |
| 6,268,042 B1 | 7/2001 | Baig | |
| 6,436,185 B1 | 8/2002 | Ayambem et al. | |
| 6,645,291 B2 | 11/2003 | Ayambem et al. | |
| 6,663,979 B2 | 12/2003 | Deodhar et al. | |
| 6,673,144 B2 | 1/2004 | Immordino et al. | |
| 6,733,581 B2 | 5/2004 | Langford | |
| 7,047,701 B2 | 5/2006 | Bonetto et al. | |
| 2002/0086114 A1 | 7/2002 | Madsen | |
| 2002/0121326 A1 | 9/2002 | Adler et al. | |
| 2003/0084633 A1 | 5/2003 | Zuber et al. | |
| 2003/0085306 A1 | 5/2003 | John et al. | |
| 2003/0113572 A1* | 6/2003 | Deodhar et al. | 428/537.5 |
| 2003/0153651 A1 | 8/2003 | Bonetto et al. | |
| 2004/0126424 A1 | 7/2004 | Zuber et al. | |
| 2004/0154264 A1* | 8/2004 | Colbert | 52/741.1 |
| 2004/0209074 A1 | 10/2004 | Randall et al. | |
| 2005/0065256 A1 | 3/2005 | Kyte et al. | |
| 2005/0229519 A1* | 10/2005 | Colbert et al. | 52/416 |
| 2005/0234174 A1* | 10/2005 | Colbert et al. | 524/425 |
| 2005/0246993 A1* | 11/2005 | Colbert et al. | 52/459 |
| 2005/0252128 A1 | 11/2005 | Colbert et al. | |
| 2006/0048684 A1 | 3/2006 | Bonetto et al. | |

FOREIGN PATENT DOCUMENTS

| | | | |
|---|---|---|---|
| AU | 719427 | | 5/2000 |
| CA | 2259115 | * | 8/1999 |
| DE | 142 872 | A1 | 7/1980 |
| DE | 37 21 668 | | 1/1989 |
| DE | 37 21 668 | A1 | 5/1989 |
| DE | 43 24 315 | | 10/1994 |
| DE | 4331141 | A1 | 3/1995 |
| EP | 0 496 682 | | 7/1992 |
| EP | 0496682 | A1 | 7/1992 |
| EP | 0 521 804 | | 1/1993 |
| EP | 0 521 804 | A1 | 7/1993 |
| EP | 1 182 235 | | 2/2002 |
| FR | 2166536 | | 8/1973 |
| FR | 2 505 908 | | 3/1982 |
| FR | 2505908 | | 11/1982 |
| FR | 2 736 079 | | 3/1997 |
| FR | 2736079 | | 3/1997 |
| FR | 2818635 | | 6/2002 |
| FR | 2818968 | | 7/2002 |
| GB | 1513763 | | 6/1978 |
| GB | 2228931 | | 9/1990 |
| JP | 60-065197 | | 4/1985 |
| JP | 09-109131 | | 4/1997 |
| WO | 97/02395 | A1 | 1/1997 |
| WO | 99/08979 | | 2/1999 |
| WO | 99/48833 | | 9/1999 |
| WO | 99/57371 | | 11/1999 |
| WO | 00/06518 | | 2/2000 |
| WO | 02/06183 | | 1/2002 |
| WO | 02/12144 | A2 | 2/2002 |
| WO | 02/058902 | A2 | 8/2002 |
| WO | 05/040475 | | 5/2005 |

OTHER PUBLICATIONS

Derwent WPI AN 1997-109001, Week 199710, Abstract of WO 9702395.
Derwent WPI AN 1989-016493, Week 198903, English Abstract of DE 3721668.
Derwent WPI AN 1993-002309, Week 199301, English Abstract of EP 0521804.
J.R. Gorman, et al., "Plaster and Drywall Systems Manual," BNI Books, Division of Building News, Inc., Apr. 12, 2003, pp. 240 and 251.
The White Book 1986 Edition, British Gypsum, Apr. 12, 2003.
The White Book, Plasterboard Fixing, Jointing and Decorating, British Gypsum, Apr. 12, 2003.
9 White, Medium Calcium Carbonate Filler, Georgia Marble Company, May 1996.
Water Absorbency of Bibulous Papers, T 432 cm—99, Approved by the Physical Properties Committee of the Process and Product Quality Division, 1999.
Standard Conditioning and Testing Atmospheres for Paper, Board, Pulp Handsheets and Related Products, T 402 om—93, Approved by the Physical Properties Committee of the Process and Product Quality Division, 1993.
Gypsum Plasterboards, Mar. 1995, 30 pages.
Ken A. Phillips, et al., Industrial Minerals in Arizona's Wallboard Joint Cement Industry, Jul. 1989, 6 pages.
Ken Phillips, et al., Industrial Minerals in Southern California's Wallboard Joint Cement Industry, Sep. 1989, 6 pages.
Gypsum Plasterboard—Part 1: Specification for Plasterboard Excluding Material Submitted to Secondary Operations, 1985, 10 pages.
Dry Lining and Partitioning Using Gypsum Plasterboard, British Standard, 1995, 50 pages.
Sauli Rennes, et al., The Influence of Binders on the Structure and Water Sorption of Coated Paper, pp. 698-703, Jun. 1989.
Technical Data, Calmote Ad, Omya UK, Jan. 1997.
Attagel 50, Engelhard, Jan. 3, 2003.
Engelhard Material Safety Data Sheet, Lawrence Industries, Aug. 19, 1992.
Fordamin Stinnes Logistics, Fordacal S2 Talc, Mar. 2001.
Defoamers for Emulsion Paints and Emulsion Plasters, BYK Chemie, 4 pages.
4 Walocel M Delivery Programme.
Emultex 596, Synthomer International Technology Individual Service, Jul. 2002.
Sil-Cell 35/34, Silbrico Corporation, 2 pages, 1993.
Methocel Cellulose Ethers for Gypsum-Based Building Materials, How Methocel Cellulose Ethers Products Maximise the Performance of Gypsum-based Building Materials, Aug. 1999.
Elotex LIQ2020, Technical Data Sheet, Mar. 14, 2002.
Twinstar Chemicals Limited, Benzoflex 9-88 Plasticiser Dipropyleneglycol Dibenzoate, 5 pages, Jun. 1996.

"ACUMER® 9400—Dispersant for Paper and Paperboard Coatings", Rohm and Haas Company, Special Polymers.

"ACUMER® 9300—Dispersant for Paper and Paperboard Coatings", Rohm and Haas Company, Special Polymers.

George M. Kutcher, Jr., CDT, CSI, "Revisiting the Levels of Gypsum Board Finish", National Gypsum Company, pp. 1-3.

Dan Eklund, "The Influence of Binders and Pigments upon the K&N Ink Absorption of Coated Papers," No. 9 1973 Papper och Trä.

New Zealand Opposition Paper in Patent No. 527112 dated Dec. 18, 2006.

Chemical Abstracts, vol. 103, No. 8, Aug. 26, 1985, Abstract No. 58270z, p. 278; XP 000185205; Abstract of JP 60 065197.

Database WPI, Week 199727, AN 1997-293470, XP002198594, Abstract of JP 09 109131.

G.D. Plump, M.A., Lightweight Partitions Having Improved Low Frequency Sound Insulations, Research and Development Department, 10 Pages, Jun. 1995.

Decision, Jun. 14, 2005, Appeal No. T 1032/03-3.2.3, and translation thereof.

International Search Report and Attached Written Opinion mailed by the International Bureau on Nov. 7, 2005 in corresponding PCT/EP2005/003990.

International Search Report and Attached Written Opinion mailed by the International Bureau on Dec. 8, 2005 in corresponding PCT/EP2005/003990.

Machine Translation DE 4324315 A (1994).

Rheological Aspects of Carboxymethyl Cellulose Acetate Butyrate (CMCABTM) in Waterborne Coatings; 8 pages.

"Acumer® 9400—Dispersant for Paper and Paperboard Coatings", Rohm and Haas Company, Special Polymers.

"Acumer® 9300—Dispersant for Paper and Paperboard Coatings", Rohm and Haas Company, Special Polymers.

George M. Kutcher, Jr., CDT, CSI, "Revisiting the Levels of Gypsum Board Finish", National Gypsum Company, pp. 1-3.

G.D. Plumb, M.A., Lightweight Partitions Having Improved Low Frequency Sound Insulations, Research and Development Department, 10 pages, Jun. 1995.

Norme Francaise, Methode de Determination d'absorption d'eau, NF Q 03-014, Sep. 1985, pp. 103-108.

Water Absorbency of Bibulous Papers, T 432 om—94, Approved by the Chemical Properties Committee of the Process and Product Quality Division, 1994.

A Marquer D'Une Pierre Blanche . . ., 11 pages.

Pregyplac Deco la nouvelle plaque blanche, Lafarge Platres, Jul. 1995.

Plaques de Platre —Definitions, Exigences et Methodes d'essai, Oct. 2000, 27 pages.

Papier, Cartons et Pates, Norme Europeenne, Dec. 1993, 10 pages.

Plaques de Parement en Platre, Oct. 1981, 12 pages.

Travaux de Peinture des Batiments, Partie 1: Cahier des Clauses Techniques, 77 pages, 1994.

* cited by examiner

CONSTRUCTION ASSEMBLY OF SKIM COATED PREFABRICATED ELEMENTS AND JOINTING MATERIAL, A KIT THEREFOR, AND METHOD OF ASSEMBLING THE SAME

CROSS-REFERENCE TO RELATED APPLICATIONS

This application is a divisional of U.S. patent application Ser. No. 10/308,084, filed Dec. 3, 2002 now U.S. Pat. No. 7,208,225 which is a continuation of U.S. patent application Ser. No. 09/633,264, filed Aug. 4. 2000, now abandoned, which is a continuation-in-part application of U.S. patent application Ser. No. 09/316,013, filed May 21, 1999, now U.S. Pat. No. 6,105,325, which is a continuation of U.S. patent application Ser. No. 08/793,444, filed May 9,1997, now abandoned, the disclosures of which are incorporated by reference herein in their entirety.

BACKGROUND OF THE INVENTION

1. Field of the Invention

The present invention relates to the construction of interior works. More particularly, the invention is concerned with any construction method, involving prefabricated elements, especially flat prefabricated elements such as boards, and at least one jointing material, e.g. a sealing coat, joint coat and/or a joint-pointing coat, which can be used especially for the finishing of a joint. The prefabricated elements can be gypsum fiberboards, cement fiberboards, gypsum wallboards or plaster boards comprising a plaster board and at least one sheet of lining paper, at least one outer layer of which has a visible outer face ready to be decorated. Said prefabricated elements are assembled together, optionally with a jointing material, and the joints are finished with a sealing coat, joint coat and/or joint-pointing coat, so as to obtain an overall visible outer surface which is relatively uniform or plane, including in the region of the joints. Such a method is employed, for example, when plasterboards covered with a cardboard lining having a joint-pointing coat are assembled, for the purpose of defining spaces within a building, especially partitions.

2. Description of Related Art

According to the document EP-A-0,521,804, the lining paper may comprise an upper layer, called an upper web, comprising white cellulose fibres, mainly synthetic, and a mineral filler of light colour, preferably white, and a pigment layer covering the upper layer, comprising a mineral filler of light colour, preferably white, and a binder.

In general the overall visible outer surface obtained according to the above-defined method needs to be prepared, before receiving any surface decoration, such as one or more layers of a film covering of the paint or lacquer type or a wallpaper. This preparation is necessitated especially by the shade or colour differences existing between the visible outer surface of the flat prefabricated elements, for example plasterboards, and the visible outer surface of the joints. After the interior work has been completed, this preparation involves covering the overall surface obtained, i.e., the lining of the flat prefabricated elements plus the joints, with one or more layers of a paint or priming or finishing coat.

The preparation operation represents an appreciable additional cost, for example in a complete process for the construction of a building. And in some cases, it is still insufficient for obtaining an overall decorated surface of uniform appearance, particularly in view of the physico-mechanical differences prevailing between the joints and the flat prefabricated elements.

SUMMARY OF THE INVENTION

The object of the present invention is to overcome the abovementioned disadvantages. More specifically, the object of the invention is a construction method breaking with the traditional approach adopted for solving the problem explained above, that is to say avoiding the need for a preparation of the overall surface, before any decoration. However, the object of the invention is a method which remains compatible with the practices of the professionals in the construction industry, especially those involved in interior works.

According to the present invention, the method differs from the traditional approach in that (1) the structure and/or composition of the external surfaces of prefabricated elements, preferably flat prefabricated elements such as boards, e.g. gypsum fiberboards, cement fiberboards, cement wallboards or plasterboards comprising a sheet of lining paper and a plaster body, and (2) the composition of a jointing material, e.g. a sealing coat, a joint coat and/or a joint-pointing coat, are coordinated with one another in order, in the dry state of the jointing material, e.g. the sealing coat, joint coat and/or joint-pointing coat, to obtain an overall surface having one or more physical characteristics, including colour or shade, which are substantially homogeneous in virtually the entire overall surface, including in the region of the visible outer face of the joints. For instance, the one or more physical characteristics differ by no more than 10%, preferably no more than 5%, at different parts of the overall surface, so that at least 90%, preferably at least 95%, homogeneity is achieved. In other words, as an example, when the jointing material is dry, the one or more physical characteristics of the outer surface of the jointing material can differ by not more than 10%, preferably not more than 5%, from the corresponding physical characteristics of the outer surface of the prefabricated elements.

According to other objects of the invention, a construction assembly for interior works is provided, comprising (1) at least one prefabricated element, preferably a flat prefabricated element, especially a board such as a gypsum fiberboard, cement fiberboard, cement wallboard or plaster board comprising a plaster body and a lining paper, wherein at least one outer layer of which has a visible outer face ready to be decorated, and (2) a jointing material, e.g. a sealing coat, joint coat and/or joint-pointing coat capable of being used especially for the finishing of a joint.

In this assembly, the structure and/or composition of the external surface of the prefabricated element, e.g. the sheet of lining paper of the plaster board, and the composition of the jointing material, e.g. a sealing coat, joint coat and/or joint-pointing coat, are coordinated with one another in order, in the dry state of the joint material, to obtain an overall surface having one or more physical characteristics, including colour or shade, which are substantially homogeneous in virtually the entire overall surface, including in the region of the visible outer face of the joints (for instance, the one or more physical characteristics differ by no more than 10%, preferably no more than 5%, at different parts of the overall surface, so that at least 90%, preferably at least 95%, homogeneity is achieved on the overall surface based on the one or more physical characteristics).

In the present invention, the final joint between adjacent prefabricated elements can be made of a sealing coat or joint coat as a primary joint, with the application of a joint-pointing coat as a secondary or finishing joint. Alternatively, in the present invention, the final joint between adjacent prefabricated elements can be made of the sealing coat or joint coat finished with one or more further layers of the same sealing or joint coat.

A joint-pointing coat, intended to be used in the method or the assembly according to the invention, is also provided.

The present invention affords the following decisive advantages which result from the surface homogeneity of the overall surface obtained according to the present invention, not only in terms of color or shade, but also in terms of particular physical or physico-chemical characteristics.

Thus, by homogenizing the surface absorption capacity of the lining paper and of the jointing material, e.g. the sealing coat, joint coat and/or joint-pointing coat, a virtually perfect appearance of the paint layer or paint layers and a virtually uniform adhesion of a wallpaper can be obtained. This subsequently is conducive to the homogeneous detachment of the wallpaper.

DESCRIPTION OF THE PREFERRED EMBODIMENTS

Figure 1:
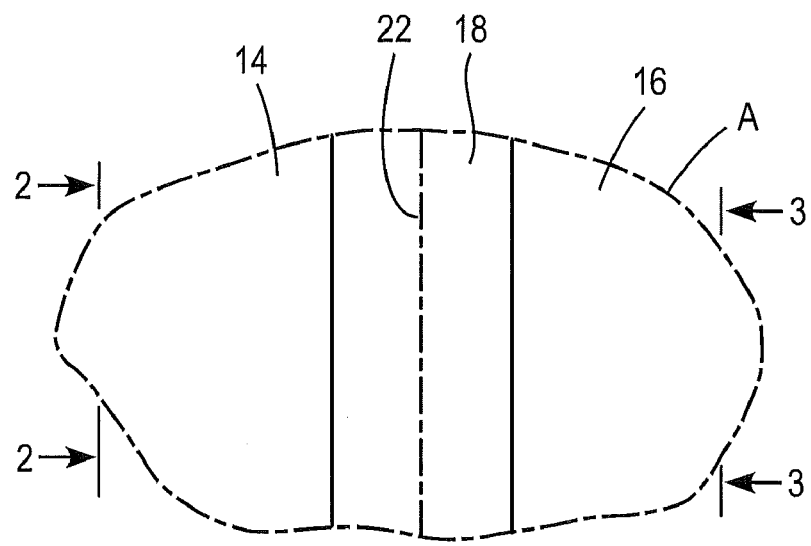
FIG. 1 is a top plan view of a portion of a construction assembly comprising at least two prefabricated elements, the portion being arbitrarily taken over a location defined by broken line A, where the at least two prefabricated elements are joined together and a jointing material is placed over the joint.

In a preferred version of the invention, there is a sealing coat intended for forming essentially the joints between various flat prefabricated elements, with the joint-pointing coat being a finishing coat which can be applied to the sealing coat.

According to the advantageous embodiment of the invention, when there are preexisting flat prefabricated elements, the composition of the jointing material, e.g. the sealing coat, joint coat and/or the joint-pointing coat, is coordinated with the structure and/or composition of the outer surface of the flat prefabricated elements, e.g. the sheet of lining paper.

According to another version of the invention, and converse to the foregoing, for a preexisting joint-pointing coat, the composition of the outer surface of the flat prefabricated elements, e.g. the sheet of lining paper, is coordinated with the composition of the jointing material, e.g. the sealing coat, joint coat and/or the joint-pointing coat.

Moreover, the method is more preferably characterized in that, in addition to the colour or shade, at least any one of the following physical characteristics is homogenized or matched between flat prefabricated elements and the jointing material, namely:

the surface appearance, including reflectance;
the absorption of surface water;
decoloration or coloration under the effect of natural light.

Advantageously, these various physical characteristics are defined as follows:

the reflectance factor of the overall surface, including that of the visible outer face of the joints, is between 70% and 80%, and preferably between 72% and 76%, for a wavelength of 457 nm;

the decoloration or coloration of the overall surface, including that of the visible outer face of the joints, has a colour deviation (delta E*) at most equal to 3 after exposure for 72 hours to a source of UV radiation arranged at 15 cm from the surface and having a wavelength at least equal to 290 nm;

the surface water absorption of the overall surface, including that of the visible outer face of the joints, is not less than 60 minutes and/or is at most equal to 15 g/m$^2$ according to the COBB test, at 23° C.

In practice, and by means of routine tests, the average person skilled in the art knows how to coordinate the structure and/or composition of the outer surface, e.g. the sheet of lining paper, of the prefabricated elements such as boards, and/or the composition of the externally visible jointing material, e.g. the joint-pointing coat, so as to satisfy the above-defined technical principles. As a result, the examples described below are in no way limiting.

The present invention will now be described by taking flat prefabricated elements, plasterboards, as an example. These boards are typically composed of a factory-cast plaster body between two sheets of paper forming both its lining and its reinforcement.

Conventionally, one of the sheets of paper used for making the plasterboards has a dark colour which can vary between a grey colour and a chestnut colour, since it is composed of cellulose fibres which have not undergone any particular purifying treatment. Traditionally, this so-called grey paper is obtained from unbleached chemical pulp and/or from mechanical pulp, and/or from thermomechanical pulp and/or from semi-chemical pulp. By mechanical pulp, it is usually meant a pulp obtained entirely by mechanical means from various raw materials, essentially wood, which can be provided by salvaged products originating from wood, such as old cardboard boxes, trimmings of kraft paper and/or old newspapers. Thermomechanical pulp means a pulp obtained by thermal treatment followed by a mechanical treatment of the raw material. By semi-chemical pulp is meant a pulp obtained by eliminating some of the non-cellulose components from the raw material by means of chemical treatment and requiring a subsequent mechanical treatment in order to disperse the fibres.

The other sheet of plasterboards has a visible face, called a lining face, of a colour generally lighter than the grey sheet. To obtain this lighter colour, the layer or layers of this face are based on chemical pulp, if appropriately bleached, composed of recycled and/or new cellulose fibres, and/or on mechanical pulp, if appropriately bleached. By chemical pulp is meant a pulp obtained by eliminating a very large proportion of the non-cellulose components from the raw material by chemical treatment, for example, by cooking in the presence of suitable chemical agents, such as soda or bisulphites. When this chemical treatment is completed by bleaching, a large part of the coloured substances is eliminated, as well as the substances which risk decomposing by ageing and giving unpleasant yellow shades associated with the presence of, for example, lignin.

In a preferred embodiment of the method of the invention, according to the document EP-A-0 521 804, the content of which is incorporated by reference, the lining paper comprises an upper layer, called an upper web, comprising white cellulose fibres, mainly synthetic, a mineral filler of light colour, preferably white, and a pigment layer covering the upper layer. The pigment layer comprises a mineral filler of light colour, preferably white, and a binder. Correspondingly, according to the present invention, the joint-pointing coat comprises a mineral filler of light colour, preferably white, the grain size of which is between 5 and 35 µm.

The fineness of the grain size of the mineral filler of the joint-pointing coat makes it possible to obtain a smooth surface corresponding to that of the lining of the board. Too large a grain size of the filler gives rise to overall surface defects, such as a reflection of light radiation on the surface of the coat which is different from that on the surface of the board, bringing about differences in tone and brightness of the shade. Too large a grain size also gives rise to differences in physical appearance which are associated with the differences in roughness between the board and the coat.

The mineral filler represents preferably between 50% and 85% of the total weight of the joint-pointing coat.

Moreover, the coat can comprise a hydrophobic agent, for example between 0.2% and 5%, and preferably between 0.5% and 3%, of the total weight of the coat, for example a silicone derivative. This agent slows the drying kinetics of the coat, which is conducive to the non-cracking of the coat. Also, this agent has higher resistance to the attack of steam during operations for the removal of wallpaper, so that the removal can be achieved without thereby impairing the good bonding of a paint or paper adhesive on the overall surface, including the visible surface of the joints. In fact, this hydrophobic agent makes it possible to level off the absorbent capacities of the surfaces of the coat and of the lining paper of the board. Thus, all paints or paper adhesives applied to the overall surface obtained exhibit little shift in absorption kinetics between the coat and the board, thus making it possible to avoid the appearance of spectra or of defects in shade homogeneity.

The coat also comprises an organic binder dispersible in aqueous phase, in a proportion of between 1 and 20%, and preferably between 2 and 12%, of the total weight of the joint-pointing coat, for example polyvinyl acetates and/or acrylic acid esters. The choice of this binder is important, since it must impart sufficient flexibility to the coat to withstand mechanical stresses, and it must have both an adhesive capacity for obtaining a good bond on the overall surface and good resistance to the attacks of UV light.

Moreover, a handling agent is provided in the composition of the coat, especially a water-retaining and thickening agent, for example methylhydroxyethylcellulose, in a proportion of 1 to 15%, and preferably of 2 to 12%, of the total weight of the joint-pointing coat.

Finally, at least one slipping agent can be included in the composition of the coat, especially a clay, in the proportion of 0.1 to 2%, and preferably of 0.1 to 0.6%, of the total weight of the joint-pointing coat. These clays are preferably silicate derivatives and more preferably clays of the attapulgite type.

Other components, such as biocides, dispersants, anti-foaming agents and pigments can also be incorporated in the composition of the coat in the conventional way.

The invention will be understood better from the following detailed example given as a non-limiting indication.

We proceed from plasterboards similar to Example 5 of document EP-A-0 521 804, which are assembled by means of a conventional sealing joint, for example a joint coat sold under the registered trade mark of "PREGYLYS"® of the Company PLATRES LAFARGE. The upper web of the lining of the board is obtained from 65% bleached synthetic cellulose fibres and 35% talcum and is covered with a pigment layer comprising, as mineral filler, 85% by weight of $CaSO_4$, $2H_2O$ in the form of needles of a length of between 3 and 5 µm and, as a binder, 10.3% by weight of styrene-butadiene copolymer. The sealing joint subsequently receives a thin layer of a joint-pointing coat according to the invention, having the following composition:

50 to 85% by weight of calcium carbonate, grain size from 5 to 35 µm, as a mineral filler;
 2 to 12% by weight of a binder comprising polyvinyl acetates and acrylic acid esters in aqueous dispersion;
 0.5 to 3% by weight of a silicone derivative as a hydrophobic agent;
 0.1 to 0.9% of a cellulose derivative of the methylhydroxyethylcellulose type;
 0.1 to 0.6% of a slipping agent of the attapulgite type;
 1 to 12% of another silicate derivative as an additional slipping agent;
 0.1 to 5% of a polycarboxylic acid ammonium salt as a dispersant;
 0.001 to 0.015 of an iron oxide as a pigment;
 0.1 to 0.3% of a preparation of N-formoles and isothiazolinones as a biocide;
 0.1 to 0.3% of a conventional anti-foaming agent;
 water up to 100%.

The weight percentages given are in relation to the total weight of the coat, unless indicated otherwise.

For comparison requirements, standard boards conforming solely to French standard NF P 72-302 and not comprising the above-defined upper web and pigment layer are assembled by means of a joint coat for a plasterboard of the range of coats "PREGYLYS"®, sold by the Company PLATRES LAFARGE.

The characteristics of the two overall surfaces thus formed are compared by applying the following tests:

(A) Degree of whiteness or reflectance factor R obtained according to standard NFQ 03038 with a wavelength of 457 nm. This degree represents the percentage ratio between of a reflected radiation of the body in question and that of a perfect diffuser under the same conditions.

(B) Surface water absorption obtained, for example, according to the COBB test. In this test, a ring defining an area of 100 $cm^2$ is filled with distilled water at 23° C. to a height of approximately 10 nm. The water is left in contact with the overall surface forming the bottom of the ring for one minute, and then the water is emptied and the excess spin-dried. The weight gain of the surface is subsequently determined and brought back to an area of 1 $m^2$. In an alternative version, a drop of distilled water of a volume of approximately 0.05 $cm^3$ at 23° C. is deposited on the surface. It is important that the drop be deposited and not allowed to fall from a variable height which consequently would crush it to a greater or lesser extent, thus falsifying the result. The duration in minutes represents the surface absorption of the tested area.

(C) UV radiation resistance obtained by exposing the overall surfaces, in a cabinet comprising eight high pressure mercury vapour lamps, each of 400 watts, to a wavelength which is not less than 290 nm. The surfaces are maintained at a distance of 15 cm from the lamps and at a temperature of 60° C. for 72 hours. The colour deviations delta E* are measured on a spectrocolorimeter according to the standard DIN 6174 at an angle of 8°, illuminant D65 as a bright specular, included in the system L*, a*, b*, in which L* is the luminance, a* represents the transition from green to red, and b* represents the transition from blue to yellow. A point E* in this system, the said point being a function of L*, a*, b*, defines the colorimetry of a sample and the deviation is measured in relation to a reference point. In general terms, a colour deviation beyond 2 becomes discernible to the naked eye.

The results of the tests (A) and (B) are collated in Table I and those of the test (C) are collated in Table II below.

TABLE I

|  | Standard overall surface | Overall surface according to the invention |
|---|---|---|
| Reflectance R (%) | Board: 50 to 60 | Board: 72 to 76 |
|  | Coat: 65 to 85 | Coat: 72 to 76 |
| Absorption | 19 | 13 |
| COBB (g/m²) | Board: 50 | Board: >=60 |
| Alternative (min) | Coat: 15 | Coat: >=60 |

This shows that the overall surface according to the present invention is clearly more homogeneous than that of an assembly according to the conventional technique. Moreover, the more homogeneous absorption time of the overall surface makes it possible to use a paint having less covering capacity than that necessary with traditional boards and coats and is also beneficial to the painting operation.

TABLE II

| Before Exposure | Standard | Invention |
|---|---|---|
| Initial measurements of the board | L* = 82.94<br>a* = −0.43<br>b* = 4.64 | L* = 90.41<br>a* = −0.03<br>b* = 3.13 |
| Initial measurements of the joint | L* = 90.70<br>a* = 0.73<br>b* = 5.28<br>Board/Joint colour deviation delta E* = 7.87 | L* = 89.70<br>a* = 0.50<br>b* = 3.60<br>Board/Joint colour deviation delta E* = 1 |
| Exposure to UV for 72 hours |  |  |
| Measurements of the board after exposure | L* = 81.10<br>a* = 0.69<br>b* = 12.93<br>Colour deviation delta E* = 8.56;<br>very substantial yellowing plus chestnut spots | L* = 90.38<br>a* = −0.91<br>b* = 7.40<br>Colour deviation delta E* = 4.36;<br>substantial yellowing |
| Measurements of the joint after exposure | L* = 88.90<br>a* = 0.91<br>b* = 3.83<br>Colour deviation delta E* = 2.32;<br>slight yellowing plus a few chestnut spots | L* = 89.17<br>a* = 0.50<br>b* = 3.19<br>Colour deviation delta E* = 0.67;<br>very slight colour deviation |

This table shows that the colour deviation before exposure to UV is much slighter for an overall surface according to the invention than for an overall surface such as is obtained traditionally.

This table also shows that the change in the colour deviation after exposure to UV is much less pronounced in the overall surface according to the invention than traditionally. In fact, the colour deviation before exposure and after exposure must be as little as possible, so that the overall surface does not give the impression to the naked eye of being spotted or being covered with zones of different shade and brightness.

This is not possible with an overall surface obtained by means of traditional plasterboards and products, but the very slight deviation of the overall surface according to the invention makes it possible to mitigate this disadvantage.

The present invention also provides in an alternate embodiment another way to provide a good matching at the joints between the prefabricated elements, preferably flat prefabricated elements such as gypsum fiberboards, cement fiberboards, gypsum wallboards or plaster boards.

According to this embodiment, a coat having a composition similar and/or adapted to the composition of the jointing material, e.g. the sealing coat, joint coat and/or the joint-pointing coat, is applied as a so-called "skim coat" (i.e., a film coat of relatively low thickness) on the outer surface of the prefabricated elements, e.g. the liner of standard plaster boards. This skim coat is applied, for example in the plant by, for instance, roll coating or spraying via a coating device, on the prefabricated element so that the skim-coated prefabricated element is delivered to the assembly site already with a skim coat on it. Said skim coat, since it has a composition matching the composition of the jointing material, e.g. the sealing coat, joint coat and/or the joint-pointing coat, for a joint will provide, once applied, uniform characteristics to the final surface.

The invention thus provides a construction assembly for interior works, comprising:

prefabricated elements, preferably flat prefabricated elements e.g. gypsum fiberboards, cement fiberboards, gypsum wall boards or plaster boards, wherein said prefabricated elements comprise a coating layer formed of at least one skim coat deposited on said prefabricated elements by a coating device; and at least one jointing material, e.g. a sealing coat, joint coat and/or joint pointing coat, which joints adjacent said prefabricated elements to form a substantially plane outer surface comprising the visible surface of said at least one jointing material and the visible surface of the skim coated prefabricated elements, wherein said at least one jointing material and said at least one skim coat comprise a mineral filler, a binder and water; and wherein the composition of said at least one jointing material and said at least one skim coat are adapted to each other, whereby said at least one jointing material and said skim coat form, both in a dry state, a substantially homogeneous outer surface having over substantially all its surface at least one of the parameters comprised in the group consisting of coloration, reflectance factor and surface water absorbability which is substantially homogeneous over said surface; and whereby said outer surface is ready to be decorated. For instance, said at least one of the parameters differs by no more than 10%, preferably no more than 5%, at different parts of the overall surface, so that at least 90%, preferably at least 95%, homogeneity is achieved. In other words, as an example, when said at least one jointing material and the prefabricated elements are dry, said at least one of the parameters of the visible surface of said at least one jointing material can differ by not more than 10%, preferably not more than 5%, from the corresponding parameter of the visible surface of the prefabricated elements.

In the present invention, the prefabricated elements, preferably flat, can be gypsum fiberboards, cement fiberboards, gypsum wallboards or plaster boards. In this embodiment, the prefabricated elements preferably are plaster boards, each of which plaster boards comprises a plaster body and at least one sheet of lining paper, wherein the lining paper comprises an upper layer or web comprising cellulose fibers of a color, preferably white, and/or a mineral filler of a color, preferably a light color.

According to a preferred embodiment, said at least one jointing material and said at least one skim coat exhibit substantially the same surface water absorbability. Preferably, said at least one jointing material and said at least one skim coat exhibit also substantially the same coloration and/or reflectance factor.

According to a preferred embodiment, said at least one jointing material, e.g. the joint-pointing coat, and said at least one skim coat have substantially the same solids formulation, the skim coat when applied having a solids content lower than the jointing material when applied.

Especially, when the skim coat is applied, the viscosity will be adjusted to the viscosity needed for the coating apparatus that will be used.

The coating apparatus is generally a coating roll, which is operated under standard conditions for coating a product onto a board. The dimensions, rotation speed, feeding, temperature, and any other operating conditions are within the skill of a person of ordinary skill in the art.

For example, compared to the jointing material such as the joint-pointing coat, the skim coat, when applied (for example, when the skim coat is applied to the prefabricated elements, or when the skim coated prefabricated elements are assembled in the methods of the present invention), will comprise more water than initially present in the jointing material such as the joint-pointing coat. It will thus generally comprise additional water, e.g., about 10 to 60%, preferably about 15 to 40%, more preferably about 25%, more water than initially present in the jointing material such as the joint-pointing coat. By "water initially present in the jointing material", it means the amount of water present in the jointing material when the jointing material is applied to the skim coated prefabricated elements, before the jointing material is in a dry state.

The final thickness of the skim coat (determined when dry) is generally between about 0.001 and about 3 mm, preferably between about 0.01 and about 2 mm, more preferably between about 0.01 and about 1 mm, and most preferably between about 0.2 and about 1 mm.

According to another preferred embodiment, the jointing material such as the sealing coat, joint coat and/or joint-pointing coat and the skim coat have the following composition, by weight:
  40 to 70% of a mineral filler, such as calcium carbonate;
  1 to 10% of hydrophobic surface perlite;
  0.1 to 10% of a binder such as polyvinyl acetates and acrylic acid esters in aqueous solution;
  0.1 to 10% of a handling agent such as a cellulosic ether;
  0.1 to 5% of a slipping agent such as clay;
  0.1 to 20% of another silicate derivative as an additional slipping agent, such as talc and mica;
  water with optional conventional additives up to 100%.

The compositions of the jointing material such as the joint-pointing coat and the skim coat are not limited to the components disclosed above in the above amounts for the preferred embodiment. These components may be present in other amounts in the compositions of the jointing material such as the joint-pointing coat and the skim coat.

In FIG. 1, skim coats 14, 16 are illustrated on prefabricated elements 10, 12. A jointing material 18 forms a substantially plane outer surface. A joint 22 is shown in broken lines to represent that the joint 22 is hidden beneath the jointing material 18. It should be appreciated that the lines in FIG. 1 are not intended to show the actual dimensions or shapes of any of the elements therein. The lines are intended to merely illustrate the physical relationship of each element with respect to the other elements.

Figure 2:
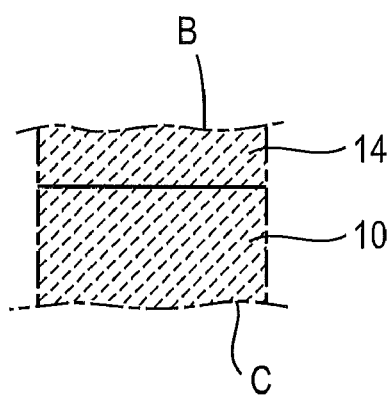
FIG. 2 is a partial cross-sectional view taken along line 2-2 of an interior portion of one of the prefabricated elements having a skim coat thereon, the view being arbitrarily truncated by broken lines B and C so as to show only the interface between the prefabricated element and the skim coat, without illustrating the full depth of the prefabricated element or the skim coat.
Figure 3:
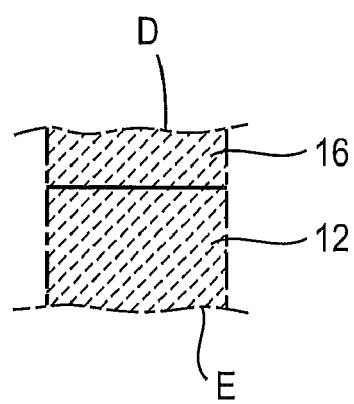
FIG. 3 is a partial cross-sectional view taken along line 3-3 of an interior portion of another one of the prefabricated elements having a skim coat thereon, the view being arbitrarily truncated by broken lines D and E so as to show only the interface between the prefabricated element and the skim coat, without illustrating the full depth of the prefabricated element or the skim coat.

FIGS. 2 and 3 illustrate partial cross-sectional views taken along lines 2-2 and 3-3 of interior portions of the prefabricated elements 10, 12 each having a respective skim coat 14, 16 thereon. The views in FIGS. 2 and 3 are arbitrarily truncated by broken lines B, C, D and E so as to show only the interface between the prefabricated element and the respective skim coat, without illustrating the full depth or any other dimensions of the prefabricated element or the skim coat. It should be appreciated that the lines in FIGS. 2 and 3 are not intended to show the actual dimensions or shapes of any of the elements therein. The lines are intended to merely illustrate the physical relationship of each element with respect to the other elements.

Figure 4:
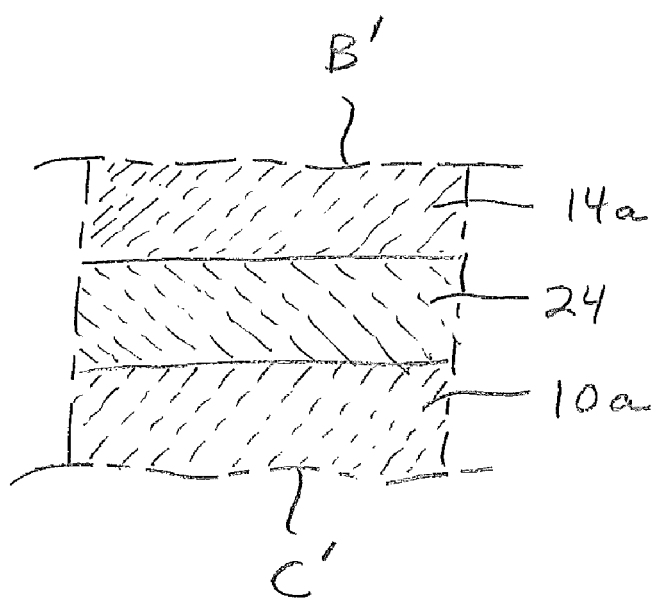
FIG. 4 is a partial cross-sectional view representing an additional embodiment and which is taken along line 2-2 of an interior portion of one of the prefabricated elements having a skim coat thereon, the view being arbitrarily truncated by lines B' and C' so as to show only the interface between the prefabricated element, the sheet of lining paper, and the skim coat, without illustrating the full depth of the prefabricated element or the skim coat.

FIG. 4 illustrates a partial cross-sectional view taken along lines 2-2 of an interior portion of an alternative embodiment of FIG. 1, the prefabricated element 10a having a lining paper 24 on the element 10a and a skim coat 14a thereon. The view in FIG. 4 is arbitrarily truncated by lines B' and C' so as to show only the interface between the prefabricated element and the skim coat, without illustrating the full depth of the prefabricated element or the skim coat.

By using the embodiment involving the skim coat, it is possible to obtain the same surface water absorption, reflectance factor and/or colour deviation as with the first embodiment depicted above, i.e. the embodiment involving adapting the composition of the jointing material, e.g. the sealing coat, joint coat and/or joint-pointing coat, to the composition of the surface of the prefabricated elements, e.g. the upper layer or web and/or the pigment layer of the plaster boards, to form a substantially homogeneous outer surface in the dry state.

The invention also provides a method for the construction on interior works, comprising the following steps:
  assembling, with at least one jointing material, e.g. a sealing coat, joint coat and/or joint-pointing coat, prefabricated elements (preferably flat prefabricated elements such as gypsum fiberboards, cement fiberboards, gypsum wallboards or plaster boards, each of which plaster boards comprises a plaster body and at least one sheet of lining paper, wherein the lining paper comprises an upper layer or web comprising cellulose fibers of a color, preferably white, and/or a mineral filler of a color, preferably a light color), wherein said prefabricated elements have a coating layer formed of at least one skim coat deposited on an outer surface of said prefabricated elements by a coating device;
  jointing between adjacent said prefabricated elements with a sealing coat or joint coat to form at least one joint;
  finishing said at least one joint with at least one jointing material, wherein said at least one jointing material can be a sealing coat, joint coat and/or joint pointing coat; and thereafter
  drying said at least one jointing material;
wherein said at least one jointing material and said at least one skim coat comprise a mineral filler, a binder and water; and wherein the compositions of said at least one jointing material and said at least one skim coat are adapted to each other, whereby said at least one jointing material and said at least one skim coat form, both in a dry state, a substantially homogeneous outer surface having over substantially all its surface at least one parameter (which parameter can be a parameter selected from the group consisting of coloration, reflectance factor and surface water absorbability) which is substantially homogeneous over said surface; and whereby said outer surface is ready to be decorated. For instance, said at least one parameter differs by no more than 10%, preferably no more than 5%, at different parts of the overall surface, so that at least 90%, preferably at least 95%, homogeneity is achieved. In other words, as an example, when the at least one jointing material and the prefabricated elements are dry, said at least one parameter of the visible surface of the at least one jointing material can differ by not more than 10%, preferably not more than 5%, from the corresponding parameter of the visible surface of the prefabricated elements.

The invention also provides a kit for the construction of interior works, comprising:

at least one prefabricated element, preferably a flat prefabricated element such as a board, e.g. a gypsum fiberboard, cement fiberboard, gypsum wallboard or plaster board (said plaster board comprising a plaster body and at least one sheet of lining paper, wherein the lining paper comprises an upper layer or web comprising cellulose fibers of a color, preferably white, and/or a mineral filler of a color, preferably a light color), wherein said prefabricated element comprises a coating layer formed of at least one skim coat deposited on an outer surface of said prefabricated element by a coating device;

at least one jointing material, e.g. a sealing coat, joint coat and/or joint-pointing coat, for jointing said prefabricated elements to form a substantially plane outer surface comprising the visible surface of at least one joint and the visible surface of the skim-coated prefabricated element, wherein said at least one jointing material and said at least one skim coat comprise a mineral filler, a binder and water; and wherein the compositions of said at least one jointing material and said at least one skim coat are adapted to each other, whereby said at least one jointing material and said at least one skim coat form, both in a dry state, a substantially homogeneous outer surface having over substantially all its surface at least one parameter (which one parameter can be a parameter selected from the group consisting of coloration, reflectance factor and surface water absorbability) which is substantially homogeneous over said surface; and whereby said outer surface is ready to be decorated. For instance, said at least one parameter differs by no more than 10%, preferably no more than 5%, at different parts of the overall surface, so that at least 90%, preferably at least 95%, homogeneity is achieved. In other words, as an example, when the at least one jointing material and the prefabricated elements are dry, said at least one parameter of the visible surface of the at least one jointing material can differ by not more than 10%, preferably not more than 5%, from the corresponding parameter of the visible surface of the prefabricated elements.

Finally, the invention provides a plaster board useful for carrying out the method of the invention, as well as other methods for the construction on interior works, where said plaster board is a flat prefabricated plaster board, comprising a plaster body and at least one sheet of lining paper, wherein the lining paper comprises an upper layer or web comprising cellulose fibers of a color, preferably white, and/or a mineral filler of a color, preferably a light color, and a coating layer formed of at least one skim coat deposited on said lining paper by a coating roll, the at least one skim coat having a thickness generally between about 0.001 and about 3 mm, preferably about 0.01 and about 2 mm, more preferably between about 0.1 and about 2 mm, and most preferably between about 0.2 and about 1 mm.

The invention claimed is:

1. A construction assembly for interior works, comprising:
   (1) skim coated prefabricated elements comprising prefabricated elements having at least one skim coat deposited on said prefabricated elements;
   (2) at least one jointing material jointing said skim coated prefabricated elements to form a substantially plane outer surface comprising a visible surface of at least one joint and a visible surface of the skim coated prefabricated elements, wherein said at least one jointing material and said at least one skim coat comprise a mineral filler, a binder and water; and wherein the compositions of said at least one jointing material and said at least one skim coat are adapted to each other, whereby said at least one jointing material and said at least one skim coat form, both in a dry state, a substantially homogeneous outer surface having, over substantially an entire visible surface of said at least one jointing material and substantially an entire visible surface of said at least one skim coat, at least one parameter selected from the group consisting of coloration, reflectance factor and surface water absorbability that is substantially homogeneous over said outer surface; and whereby said outer surface is ready to be decorated.

2. The construction assembly according to claim 1, wherein said at least one jointing material and said at least one skim coat exhibit substantially the same surface water absorbability.

3. The construction assembly according to claim 1, wherein said at least one jointing material and said at least one skim coat have substantially a same composition of solids, although, prior to the dry state, said at least one skim coat when applied has a solids content lower than said at least one jointing material when applied.

4. The construction assembly according to claim 3, wherein said at least one skim coat comprises about 15 to 40% more water than initially present in said at least one jointing material.

5. The construction assembly according to claim 4, wherein said at least one skim coat comprises about 25% more water than initially present in said at least one jointing material.

6. The construction assembly according to claim 1, wherein said at least one skim coat is applied to said prefabricated elements with a coating roll.

7. The construction assembly according to claim 1, wherein said at least one skim coat has a thickness between about 0.01 mm and about 2 mm.

8. The construction assembly according to claim 7, wherein said at least one skim coat has a thickness between about 0.2 and about 1 mm.

9. The construction assembly according to claim 1, wherein said at least one jointing material is at least a joint-pointing coat, wherein said joint-pointing coat and said at least one skim coat have the following composition by weight: 40 to 70% of a mineral filler; 1 to 10% of hydrophobic surface perlite; 0.1 to 10% of a binder; 0.1 to 10% of a handling agent; 0.1 to 5% of a slipping agent; 0.1 to 20% of another silicate derivative as an additional slipping agent; and water with optional additives up to 100%.

10. The construction assembly according to claim 9, wherein the mineral filler is calcium carbonate, the binder is either polyvinyl acetate or acrylic acid ester in aqueous solution, the handling agent is a cellulosic ether, the slipping agent is clay, and the additional slipping agent is either talc or mica.

11. The construction assembly according to claim 1, wherein the surface water absorption of each of said at least one jointing material and said at least one skim coat is not less than 60 minutes such as measured by the water drop test, at 23° C.

12. The construction assembly according to claim 1, wherein the reflectance factor of the overall surface, including that of a visible face of said at least one jointing material in a dry state, is in the range of 70% to 80% for a wavelength of 457 nm.

13. The construction assembly according to claim 12, wherein the reflectance factor of the overall surface is in the range of 72% to 76% for a wavelength of 457 nm.

14. The construction assembly according to claim 1, wherein the coloration of the overall surface, including that of a visible face of said at least one jointing material in a dry state, has a color deviation (delta E*) at most equal to 3 after exposure for 72 hours to a source of UV radiation arranged at 15 cm from the surface and having a wavelength at least equal to 290 nm.

15. The construction assembly of claim 1, wherein said prefabricated elements are plaster boards, each of which plaster boards comprises a plaster body and at least one sheet of lining paper, wherein the lining paper comprises cellulose fibers or a mineral filler.

16. The construction assembly of claim 15, wherein the cellulose fibers are white.

17. The construction assembly of claim 1, wherein, when said at least one jointing material and said at least one skim coat are both in a dry state, said at least one of the parameters differs by no more than 10% at different parts of the outer surface, so that at least 90% homogeneity is achieved.

18. The construction assembly of claim 1, wherein said at least one skim coat comprises a mineral filler of having a grain size of between 5 and 35 μm.

19. The construction assembly of claim 1, wherein said at least one skim coat comprises, on a wet basis, a mineral filler in an amount of between 40% and 70% of the total weight.

20. The construction assembly of claim 1, wherein said at least one skim coat comprises, on a wet basis, an organic binder dispersible in an aqueous phase, which organic binder represents between 1% and 20% of the total weight.

21. The construction assembly of claim 1, wherein said jointing material comprises, by weight based on the total weight of the jointing material, when applied and prior to the dry state:
between 50% and 85% of at least one mineral filler of white color, having a grain size of between 5 and 35 μm;
at least one organic binder dispersible in an aqueous phase, which organic binder represents between 1% and 20%;
at least one handling agent;
water up to 100%.

22. The construction assembly of claim 21, wherein said jointing material further comprises a handling agent which is a water-retaining and thickening agent.

23. The construction assembly of claim 21, wherein said jointing material further comprises a slipping agent which is a clay.

24. A construction assembly for interior works, comprising:
(1) skim coated prefabricated elements comprising prefabricated elements having a coating layer formed of at least one skim coat deposited on said prefabricated elements, said at least one skim layer having a thickness between about 0.01 mm and about 2 mm;
(2) at least one jointing material jointing said skim coated prefabricated elements to form a substantially plane outer surface comprising a visible surface of at least one joint and a visible surface of the skim coated prefabricated elements; wherein said at least one jointing material and said at least one skim coat comprise a mineral filler, a binder and water; wherein said at least one jointing material and said at least one skim coat have substantially a same composition of solids, although, prior to a dry state, said at least one skim coat when applied has a solids content lower than said at least one jointing material when applied, whereby said at least one jointing material and said at least one skim coat form, both in the dry state, a substantially homogeneous outer surface having, over substantially an entire visible surface of said at least one jointing material and substantially an entire visible surface of said at least one skim coat, at least one parameter selected from the group consisting of coloration, reflectance factor and surface water absorbability that is substantially homogeneous over said outer surface; and whereby said outer surface is ready to be decorated.

25. The construction assembly according to claim 24, wherein said at least one skim coat comprises about 15 to 40% more water than initially present in said at least one jointing material.

26. The construction assembly according to claim 25, wherein said at least one skim coat comprises about 25% more water than initially present in said at least one jointing material.

27. The construction assembly according to claim 24, wherein said at least one jointing material and said at least one skim coat exhibit substantially the same surface water absorbability.

28. The construction assembly according to claim 24, wherein said at least one jointing material and said at least one skim coat have the following composition, by weight: 40 to 70% of a mineral filler; 1 to 10% of hydrophobic surface perlite; 0.1 to 10% of a binder; 0.1 to 10% of a handling agent; 0.1 to 5% of a slipping agent; 0.1 to 20% of another silicate derivative as an additional slipping agent; and water with optional additives up to 100%.

29. The construction assembly according to claim 28, wherein the mineral filler is calcium carbonate, the binder is either polyvinyl acetate or acrylic acid ester in aqueous solution, the handling agent is a cellulosic ether, the slipping agent is clay, and the additional slipping agent is either talc or mica.

30. The construction assembly according to claim 24, wherein the surface water absorption of each of said at least one jointing material and said at least one skim coat is not less than 60 minutes such as measured by the water drop test, at 23° C.

31. The construction assembly according to claim 24, wherein the reflectance factor of the overall surface, including that of a visible face of said at least one jointing material in a dry state, is in the range of 70% to 80% for a wavelength of 457 nm.

32. The construction assembly according to claim 31, wherein the reflectance factor of the overall surface is in the range of 72% to 76% for a wavelength of 457 nm.

33. The construction assembly according to claim 24, wherein the coloration of the overall surface, including that of a visible face of said at least one jointing material in a dry state, has a color deviation (delta E*) at most equal to 3 after exposure for 72 hours to a source of UV radiation arranged at 15 cm from the surface and having a wavelength at least equal to 290 nm.

34. The construction assembly of claim 24, wherein said prefabricated elements are plaster boards, each of which plaster boards comprises a plaster body and at least one sheet of lining paper, wherein the lining paper comprises cellulose fibers or a mineral filler.

35. The construction assembly of claim 34, wherein the cellulose fibers are white.

36. The construction assembly of claim 24, wherein, when said at least one jointing material and said at least one skim coat are both in a dry state, said at least one of the parameters differs by no more than 10% at different parts of the outer surface, so that at least 90% homogeneity is achieved.

37. The construction assembly of claim 24, wherein said at least one skim coat comprises a mineral filler of having a grain size of between 5 and 35 µm.

38. The construction assembly of claim 24, wherein said at least one skim coat comprises, on a wet basis, a mineral filler in an amount of between 40% and 70% of the total weight.

39. The construction assembly of claim 24, wherein said at least one skim coat comprises, on a wet basis, an organic binder dispersible in an aqueous phase, which organic binder represents between 1% and 20% of the total weight.

40. The construction assembly of claim 24, wherein said jointing material comprises, by weight based on the total weight of the joint material, when applied and prior to the dry state:
   between 50% and 85% of at least one mineral filler of white color, having a grain size of between 5 and 35 µm;
   at least one organic binder dispersible in an aqueous phase, which organic binder represents between 1% and 20%;
   at least one handling agent;
   water up to 100%.

41. The construction assembly of claim 40, wherein said jointing material further comprises a handling agent which is a water-retaining and thickening agent.

42. The construction assembly of claim 40, wherein said jointing material further comprises a slipping agent which is a clay.

43. A method for the construction of interior works, comprising the following steps:
   (1) assembling skim coated prefabricated elements, wherein said skim coated prefabricated elements have a coating layer formed of at least one skim coat deposited on said prefabricated elements by a coating device;
   (2) jointing adjacent prefabricated elements with at least a sealing coat or joint coat to form joints;
   (3) finishing said joints between adjacent said prefabricated elements with at least one jointing material, wherein said at least one jointing material is a sealing coat, joint coat or joint-pointing coat; and thereafter
   (4) drying said at least one jointing material;
   wherein said at least one jointing material and said at least one skim coat comprise a mineral filler, a binder and water; whereby said at least one jointing material and said at least one skim coat form, both in a dry state, a substantially homogeneous outer surface having, over substantially an entire visible surface of said at least one jointing material and substantially an entire visible surface of said at least one skim coat, at least one parameter selected from the group consisting of coloration, reflectance factor and surface water absorbability that is substantially homogeneous over said outer surface; and whereby said outer surface is ready to be decorated.

44. The method according to claim 43, wherein said at least one jointing material and said at least one skim coat exhibit substantially the same surface water absorbability.

45. The method according to claim 43, wherein said at least one jointing material and said at least one skim coat have substantially a same composition of solids, although, prior to the dry state, said at least one skim coat when applied has a solids content lower than said at least one jointing material.

46. The method according to claim 45, wherein said at least one skim coat, when applied, comprises about 15 to 40% more water than initially present in said at least one jointing material.

47. The method according to claim 46, wherein said at least one skim coat comprises about 25% more water than initially present in said at least one jointing material.

48. The method according to claim 43, wherein said at least one skim coat is applied on said prefabricated elements with a coating roll.

49. The method according to claim 43 wherein said at least one skim layer has a thickness between about 0.1 and about 2 mm.

50. The method according to claim 49 wherein said at least one skim coat has a thickness between about 0.2 and about 1 mm.

51. The method according to claim 43, wherein said at least one jointing material is a joint-pointing coat, wherein said joint-pointing coat and said skim coat have the following composition, by weight: 40 to 70% of a mineral filler; 1 to 10% of hydrophobic surface perlite; 0.1 to 10% of a binder; 0.1 to 10% of a handling agent; 0.1 to 5% of a slipping agent; 0.1 to 20% of another silicate derivative as an additional slipping agent; and water with optional additives up to 100%.

52. The method according to claim 51, wherein the mineral filler is calcium carbonate, the binder is either polyvinyl acetate or acrylic acid ester in aqueous solution, the handling agent is a cellulosic ether, the slipping agent is clay, and the additional slipping agent is either talc or mica.

53. The method according to claim 43, wherein the surface water absorption of each of said at least one jointing material and said at least one skim coat is not less than 60 minutes such as measured by the water drop test, at 23° C.

54. The method according to claim 43, wherein the reflectance factor of the overall surface, including that of a visible face of said at least one jointing material in a dry state, is in the range of 70% to 80% for a wavelength of 457 nm.

55. The method according to claim 54, wherein the reflectance factor of the overall surface is in the range of 72% to 76% for a wavelength of 475 nm.

56. The method according to claim 43, wherein the coloration of the overall surface, including that of a visible face of said at least one jointing material in a dry state, has a color deviation (delta E*) at most equal to 3 after exposure for 72 hours to a source of UV radiation arranged at 15 cm from the surface and having a wavelength of at least equal to 290 nm.

57. The method of claim 43, wherein said prefabricated elements are plaster boards, each of which plaster boards comprises a plaster body and at least one sheet of lining paper, wherein the lining paper comprises cellulose fibers or a mineral filler.

58. The method of claim 57, wherein the cellulose fibers are white.

59. The method of claim 43, wherein, when said at least one jointing material and said at least one skim coat are both in a dry state, said at least one of the parameters differs by no more than 10% at different parts of the outer surface, so that at least 90% homogeneity is achieved.

60. The method of claim 43, wherein said at least one skim coat comprises a mineral filler of having a grain size of between 5 and 35 µm.

61. The method of claim 43, wherein said at least one skim coat comprises, on a wet basis, a mineral filler in an amount of between 40% and 70% of the total weight.

62. The method of claim 43, wherein said at least one skim coat comprises, on a wet basis, an organic binder dispersible in an aqueous phase, which organic binder represents between 1% and 20% of the total weight.

63. The method of claim 43, wherein said jointing material comprises, by weight based on the total weight of the jointing material, when applied:
- between 50% and 85% of at least one mineral filler of white color, having a grain size of between 5 and 35 µm;
- at least one organic binder dispersible in an aqueous phase, which organic binder represents between 1% and 20%;
- at least one handling agent;
- water up to 100%.

64. The method of claim 63, wherein said jointing material further comprises a handling agent which is a water-retaining and thickening agent.

65. The method of claim 63, wherein said jointing material further comprises a slipping agent which is a clay.

66. A kit for the construction of interior works, comprising:
(1) at least one skim coated prefabricated element, comprising at least one prefabricated element having a coating layer formed of at least one skim coat deposited on said at least one prefabricated element by a coating device; and
(2) at least one jointing material for jointing said skim coated prefabricated element to form a substantially plane outer surface comprising a visible surface of said at least one jointing material and a visible surface of said at least one skim coated prefabricated element, wherein said at least one jointing material and said at least one skim coat comprise a mineral filler, a binder and water; whereby said at least one jointing material and said at least one skim coat form, both in a dry state, a substantially homogeneous outer surface having, over substantially an entire visible surface of said at least one jointing material and substantially an entire visible surface of said at least one skim coat, at least one parameter selected from the group consisting of coloration, reflectance factor and surface water absorbability that is substantially homogeneous over said outer surface; and whereby said outer surface is ready to be decorated.

67. The kit according to claim 66, wherein said at least one jointing material and said at least one skim coat exhibit substantially the same surface water absorbability.

68. The kit according to claim 66, wherein said at least one jointing material and said at least one skim coat have substantially a same solids, although, prior to the dry state, said at least one skim coat when applied has a solids content lower than said at least one jointing material when applied.

69. The kit according to claim 68, wherein said at least one skim coat, when applied, comprises about 15 to 40% more water than initially present in said at least one jointing material.

70. The kit according to claim 66, wherein said at least one skim coat is applied on said prefabricated elements with a coating roll.

71. The kit according to claim 66, wherein said at least one skim layer has a thickness between about 0.01 and about 2 mm.

72. The kit according to claim 71, wherein said at least one skim coat has a thickness between about 0.2 and about 1 mm.

73. The kit according to claim 66, wherein said at least one jointing material is at least a joint-pointing coat, said joint-pointing coat and said at least one skim coat have the following composition, by weight: 40 to 70% of a mineral filler; 1 to 10% of hydrophobic surface perlite; 0.1 to 10% of a binder; 0.1 to 10% of a handling agent; 0.1 to 5% of a slipping agent; 0.1 to 20% of another silicate derivative as an additional slipping agent; and water with optional additives up to 100%.

74. The kit according to claim 73, wherein the mineral filler is calcium carbonate, the binder is either polyvinyl acetate or acrylic acid ester in aqueous solution, the handling agent is a cellulosic ether, the slipping agent is clay, and the additional slipping agent is either talc or mica.

75. The kit according to claim 66, wherein the surface water absorption of each of said at least one jointing material and said at least one skim coat is not less than 60 minutes such as measured by the water drop test at 23° C.

76. The kit according to claim 66, wherein the reflectance factor of the overall surface, including that of a visible face of said at least one jointing material in a dry state, is in the range of 70% to 80% for a wavelength of 457 nm.

77. The kit according to claim 76, wherein the reflectance factor of the overall surface, including that of an outer face of the dried joint-pointing coat, is in the range of 72 to 76% for a wavelength of 457 nm.

78. The kit according to claim 66, wherein the coloration of the overall surface, including that of a visible face of said at least one jointing material in a dry state, has a color deviation (delta E*) at most equal to 3 after exposure for 72 hours to a source of UV radiation arranged at 15 cm from the surface and having a wavelength at least equal to 290 nm.

79. The kit of claim 66, wherein said prefabricated elements are plaster boards, each of which plaster boards comprises a plaster body and at least one sheet of lining paper, wherein the lining paper comprises cellulose fibers or a mineral filler.

80. The kit of claim 79, wherein the cellulose fibers are white.

81. The kit of claim 66, wherein, when said at least one jointing material and said at least one skim coat are both in a dry state, said at least one of the parameters differs by no more than 10% at different parts of the outer surface, so that at least 90% homogeneity is achieved.

82. The kit of claim 67, wherein said at least one skim coat comprises a mineral filler of having a grain size of between 5 and 35 µm.

83. The kit of claim 67, wherein said at least one skim coat comprises, on a wet basis, a mineral filler in an amount of between 40% and 70% of the total weight.

84. The kit of claim 67, wherein said at least one skim coat comprises, on a wet basis, an organic binder dispersible in an aqueous phase, which organic binder represents between 1% and 20% of the total weight.

85. A construction assembly for interior works, comprising:
(1) skim coated prefabricated elements comprising prefabricated elements having at least one skim coat deposited on said prefabricated elements;
(2) at least one jointing material jointing said skim coated prefabricated elements to form a substantially plane outer surface comprising a visible surface of at least one joint and a visible surface of the skim coated prefabricated elements,
wherein said at least one jointing material and said at least one skim coat comprise a mineral filler, a binder and water; and wherein said at least one jointing material and said at least one skim coat, in the dry state, each have a surface water absorbability which is at least 60 minutes such as measured by the water drop test at 23° C. and each have a surface having a reflectance factor between 70% and 80% for a wavelength of 457 nm.

86. The construction assembly according to claim 85, wherein the reflectance factor of the overall surface is in the range of 72% to 76% for a wavelength of 457 nm.

87. The construction assembly according to claim 85, wherein said at least one skim coat has a thickness between about 0.01 mm and about 2 mm.

88. The construction assembly according to claim 85, wherein said at least one skim coat has a thickness between about 0.2 and about 1 mm.

89. A construction assembly for interior works, comprising:
   (1) skim coated prefabricated elements comprising prefabricated elements having a coating layer formed of at least one skim coat deposited on said prefabricated elements, said at least one skim layer having a thickness between about 0.01 mm and about 2 mm;
   (2) at least one jointing material jointing said skim coated prefabricated elements to form a substantially plane outer surface comprising a visible surface of at least one joint and a visible surface of the skim coated prefabricated elements; wherein said at least one jointing material and said at least one skim coat comprise a mineral filler, a binder and water; wherein said at least one jointing material and said at least one skim coat have substantially the same solids formulation; and wherein said at least one jointing material and said at least one skim coat, in the dry state, each have a surface water absorbability which is at least 60 minutes such as measured by the water drop test at 23° C. and each have a surface having a reflectance factor between 70% and 80% for a wavelength of 457 nm.

90. The construction assembly according to claim 89, wherein the reflectance factor of the overall surface is in the range of 72% to 76% for a wavelength of 457 nm.

91. The construction assembly according to claim 89, wherein said at least one skim coat has a thickness between about 0.2 and about 1 mm.

92. A method for the construction of interior works, comprising the following steps:
   (1) assembling skim coated prefabricated elements, wherein said skim coated prefabricated elements have a coating layer formed of at least one skim coat deposited on said prefabricated elements by a coating device;
   (2) jointing adjacent prefabricated elements with at least a sealing coat or joint coat to form joints;
   (3) finishing said joints between adjacent said prefabricated elements with at least one jointing material, wherein said at least one jointing material is a sealing coat, joint coat or joint-pointing coat; and thereafter
   (4) drying said at least one jointing material;
   wherein said at least one jointing material and said at least one skim coat comprise a mineral filler, a binder and water; and wherein said at least one jointing material and said at least one skim coat, in the dry state, each have a surface water absorbability which is at least 60 minutes such as measured by the water drop test at 23° C. and each have a surface having a reflectance factor between 70% and 80% for a wavelength of 457 nm.

93. The method according to claim 92, wherein the reflectance factor of the overall surface is in the range of 72% to 76% for a wavelength of 457 nm.

94. The method according to claim 92, wherein said at least one skim coat has a thickness between about 0.01 mm and about 2mm.

95. The method according to claim 92, wherein said at least one skim coat has a thickness between about 0.2 and about 1 mm.

96. A kit for the construction of interior works, comprising:
   (1) at least one skim coated prefabricated element, comprising at least one prefabricated element having a coating layer formed of at least one skim coat deposited on said at least one prefabricated element by a coating device; and
   (2) at least one jointing material for jointing said skim coated prefabricated element to form a substantially plane outer surface comprising a visible surface of said at least one jointing material and a visible surface of said at least one skim coated prefabricated element;
   wherein said at least one jointing material and said at least one skim coat comprise a mineral filler, a binder and water; and wherein said at least one jointing material and said at least one skim coat, in the dry state, each have a surface water absorbability which is at least 60 minutes such as measured by the water drop test at 23° C. and each have a surface having a reflectance factor between 70% and 80% for a wavelength of 457 nm.

97. The kit according to claim 96, wherein the reflectance factor of the overall surface is in the range of 72% to 76% for a wavelength of 457 nm.

98. The kit according to claim 96, wherein said at least one skim coat has a thickness between about 0.01 mm and about 2 mm.

99. The kit according to claim 96, wherein said at least one skim coat has a thickness between about 0.2 and about 1 mm.

* * * * *